July 9, 1957 W. H. C. SEWARD 2,798,457
PORTABLE STOCK FEEDER WITH A REMOVABLE HOPPER
Filed March 9, 1954 2 Sheets-Sheet 1
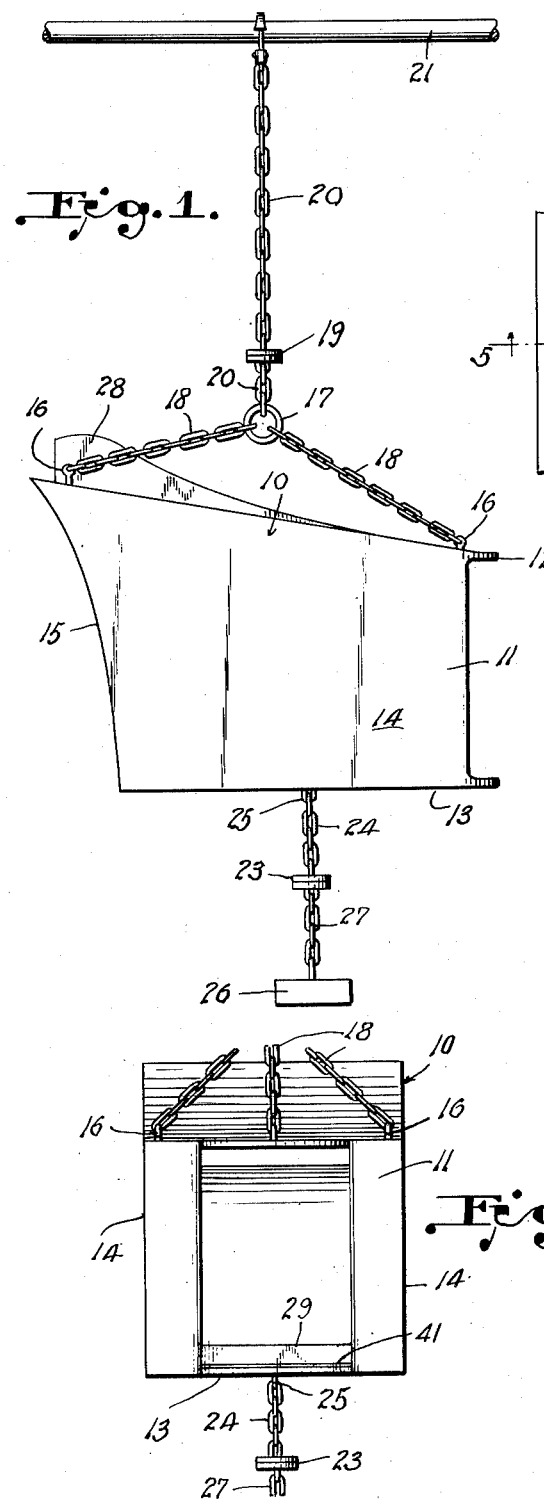
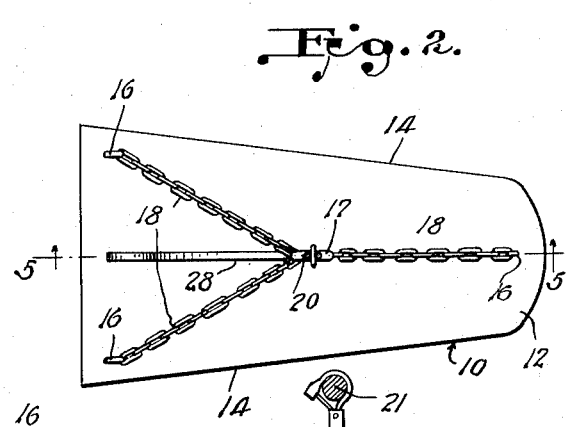
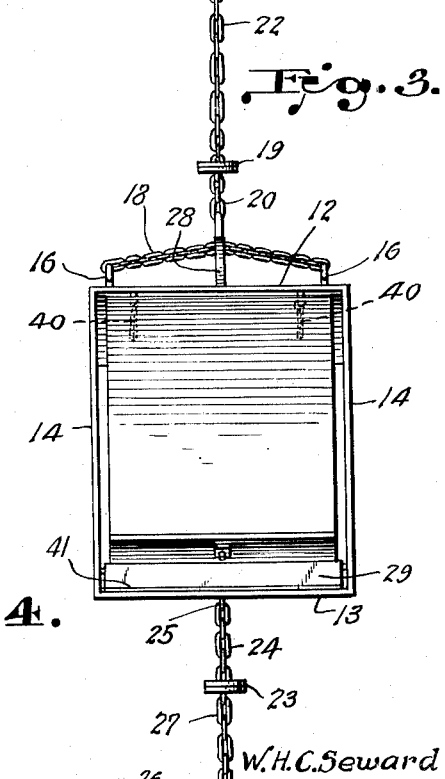
W. H. C. Seward
INVENTOR
BY
ATTORNEYS.

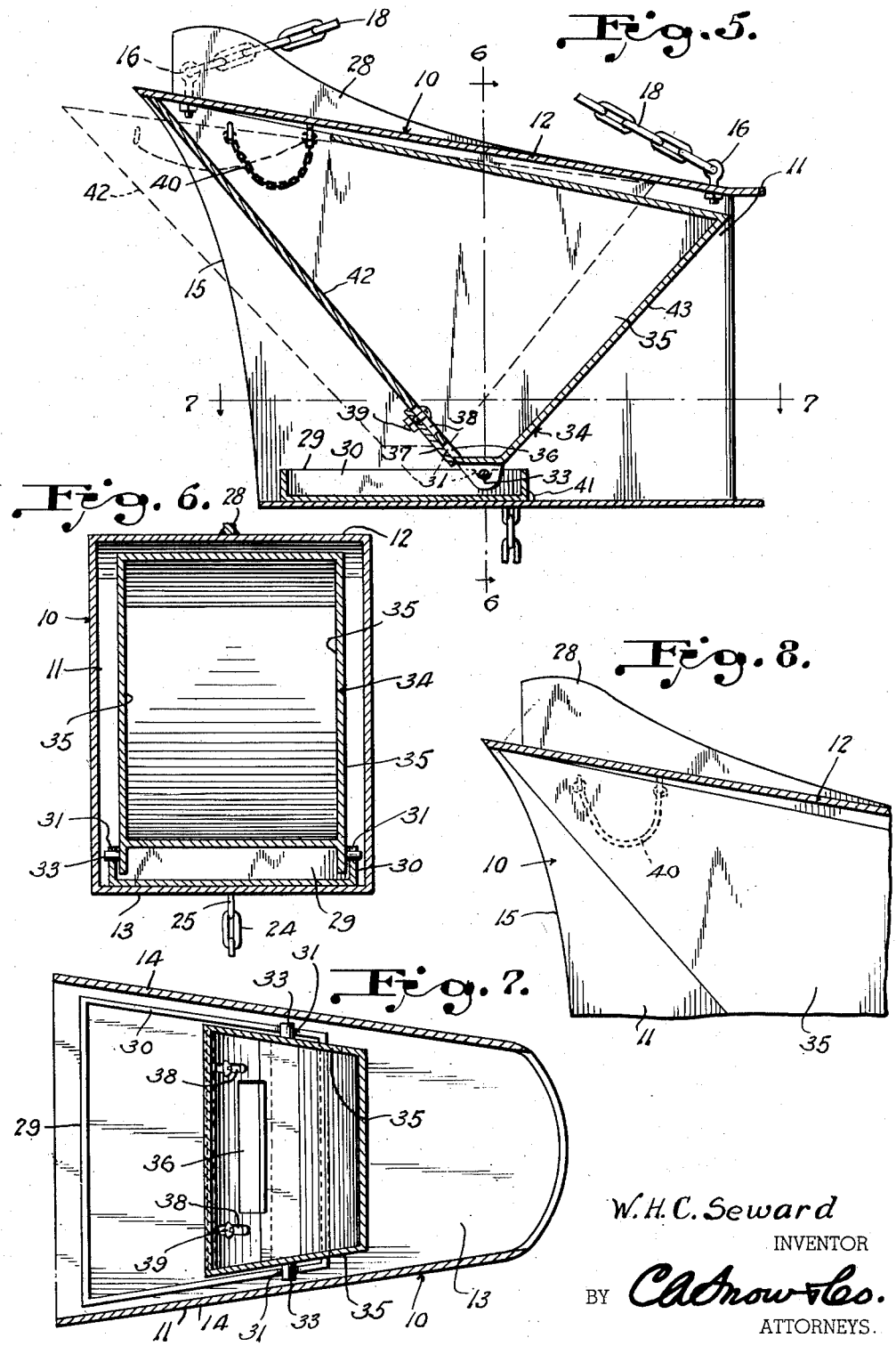

United States Patent Office 2,798,457
Patented July 9, 1957

2,798,457
PORTABLE STOCK FEEDER WITH A REMOVABLE HOPPER

William H. C. Seward, Arcadia, Fla.

Application March 9, 1954, Serial No. 414,969

1 Claim. (Cl. 119—51)

This invention relates to a portable stock feeder with a removable hopper and more particularly to a suspended stock feeder having a removable feeder hopper which may be easily removed from a feeder in a pasture for just as easy connection in another feeder in a different pasture.

It is a principal object of this invention to provide a stock feeder of the kind to be more particularly described hereinafter having a hollow, open ended, shell or cover with tapered side walls between which a feed hopper may be selectively installed or removed when the feeding animals are moved from one pasture to another.

Another object of this invention is to provide a suspended stock feeder of this kind having an inclined roof, the pitch of which permits rain water to flow freely from the roof and as the roof of the feeder has a tight fitting connection to the feeder above the feed containing hopper, no deterioration and spoilage of the feed will be occasioned.

Still another object of this invention is to provide a suspended stock feeder of this kind having a controllable feed gate or feed valve to control the free flow of any size of feed such as minerals, salts or feed pellets from the feed hopper to the floor of the feed pan in the feeder.

It is yet another object of this invention to provide a suspended stock feeder of this kind having a wind vane on the cover to veer the suspended feeder into the wind there being swivel connections between the suspension means and the free suspending anchor for the feeder.

Still another object of this invention is to provide a suspended stock feeder of this kind having a deflector curve on the shell or hull to prevent the feeding animals from self injury and for preserving the animal from being blinded while feeding.

A still further object of this invention is to provide a suspended stock feeder of this kind which is inexpensive in its initial cost and easy to install and remove from a tree limb or other type of cross bar support.

Other and further objects and advantages of the invention will be hereinafter described and the novel features thereof defined in the appended claim.

In the drawings:

Fig. 1 is a side elevation of a novel suspended stock feeder constructed according to an embodiment of my invention.

Fig. 2 is a top plan view

Fig. 3 is a front elevation of the stock feeder.

Fig. 4 is a rear elevation thereof.

Fig. 5 is a side elevation in section, taken on the line 5—5 of Fig. 2.

Fig. 6 is a transverse section in elevation taken on the line 6—6 of Fig. 5.

Fig. 7 is a plan section taken on the line 7—7 of Fig. 5.

Fig. 8 is a side elevation in section, partly broken away of the front end of the feed hopper.

Referring more particularly to the drawings the numeral 10 designates generally a suspended stock feeder constructed according to an embodiment of my invention, the stock feeder being suspended from an overhead support as a bar or a limb of a tree as clearly shown in Fig. 1 of the drawings.

The stock feeder 10 is formed with a hollow hull 11 there being a top wall 12 spaced vertilcally from a bottom wall 13 as clearly shown in Fig. 6 of the drawings.

Side walls 14 are connected between the top wall 12 and bottom wall 13 the side walls converge toward the rear end. Deflectors 15 are formed on the front end of the hull 11 for engagement with the horns of an animal feeding from the feeder 10 to prevent the animal from self-injury and to prevent the animal from being blinded while feeding. The horns contact the deflectors 15, before the other parts of the head can reach the ends of sides 14.

Hook eyes 16 are secured to the top wall 12 adjacent the opposite ends thereof and a supporting ring 17 is disposed above the eyes 16 and top wall 12 being connected by chains 18 which extend downwardly and outwardly from the ring 17 to the eyes 16.

A swivel 19 is disposed above the ring 17 and connected to the ring by a chain 20 so that the top wall 12 is suspended from the ring 17 which in turn is suspended from the swivel 19. A fixed support 21 is positioned above the swivel 19 and a chain, rope or cable 22 is connected between the swivel 19 and the fixed arm or support 21 as clearly indicated in Fig. 1 of the drawings.

In order to maintain the feeder 10 in a proper suspended position relative to the fixed support 21 a swivel 23 is positioned below the bottom wall 13, the swivel 23 being connected to the bottom wall 13 by a chain 24 which depends from an eye 25 which is fixed to the bottom wall.

An anchor 26 is suspended from the lower swivel 23 by the chain 27, the anchor 26 being formed of stone, brick or other weighted objects in order to maintain the feeder 10 swinging in the wind.

A weather vane 28 is secured to the top wall 12, extending along the length thereof in order to hold the feeder 10 in a proper position relative to the wind in the pasture.

A tray 29 is fixedly secured on bottom 13 as by welding, soldering 41 or the like, the tray having a pair of spaced apart side walls 30 with a U-shaped recess 31 therein, adjacent the inner end of the side walls for receiving pivot pins 33 of the hopper 34 which is pivotally supported on the tray 29 as seen in Figs. 5, 6 and 7. The pivot pins 33 extend outwardly from the side walls 35 of the hopper for engagement within the recesses on the edges of the side walls 30 of the tray 29, the recesses on the edge opening upwardly.

The hopper 34 is provided with downwardly inclined front and rear walls 42 and 43 respectively for sliding the feed therein toward the tranversely extending opening 36 through which it drops from the hopper 34 downwardly to the tray 29. The topper 34 also includes normally divergent side walls 35, of triangular configuration.

A valve plate 37 is slidably mounted on the front wall of the hopper having the opening and the valve plate 37 is provided with a pair of spaced apart vertically extending slots 38 through which pins 39 are slidably extended to provide for the sliding movement of the valve plate upwardly from the point of juncture of the end walls 35 of the hopper 34 in order to adequately adjust the flow of the feed from the hopper to the tray.

Use and operation

To fill the hopper 34, it is swung outwardly about pivot points 33, until stop chain 40 is straightened. This chain is fixed to top 12 and latches to a side wall 35 of the hopper. The hopper is then swung back until the rear top edge rests against the inner end of the hull 11 as seen in Fig. 5. The valve plate 37 is then adjusted to suit the kind of feed or mineral provided.

The hopper 34 alone can be moved elsewhere, as desired, by unlatching chain 40 from the side wall 35. It is then swung out relative to the hull, the pivot pins 33 are lifted clear of the recesses 31, and the hopper withdrawn. It can be placed in another stock feeder hull, as desired, by reversing these steps.

The hopper is light and easily transported. This overhead suspension of the stock feeder gives many advantages. The weight 26 permits only a slight swing in a wind, yet the swivels 19 and 23 and vane 28 cause the hull 11 to readily turn the open feed end to leeward. This flexible, light device avoids injury to itself or the stock animals, as it gives way when contacted by an animal.

By this type of suspension including the flexible suspending means for the hull and anchor 26, including the swivels 19 and 23 the hull 11 may be suspended from a fixed support 21 in any pasture which may be convenient for the person owning the stock feeder 10.

The connection of the chain 20 to the fixed support 21 may be made by any type of snap fastener so that the feeder 10 may be easily removed from any fixed support 21 and connected to another fixed support 21 so that the feeder 10 may be hung in any selected pasture or changed by removal from one pasture to another pasture. The feeder 10 is thus easily removable and just as easily installed where and as desired.

The shape of the feeder alone will veer into the wind and the vane merely assists in directing the feeder to its wanted position relative to the wind and field for the feeding animals.

The end walls of the plate 29 also provide a baffle as the end walls and valve plate 37 of the hopper 34.

The design of the feeder and hopper is particularly suited for its use as they are preferably made of cypress but it is to be understood that any other desired sort of material may be used with somewhat equally desirable results for a stock feeder of this kind.

While the specific details of one embodiment of this invention have been herein shown and described, the invention is not confined thereto as changes and alterations may be made without departing from the spirit and scope thereof as defined in the appended claim.

I claim:

A stock feeder comprising an elongated housing open at the front and rear ends thereof and formed of a horizontal bottom wall, rearwardly convergent side walls and a downwardly and rearwardly inclined top wall, means swingably suspending said housing from a support, a tray fixed to said bottom wall adjacent the front end thereof, said tray including upstanding sides each formed with a notch in the upper edge thereof, a hopper loosely disposed in said housing, said hopper being formed of upright rearwardly convergent side walls spaced inwardly from said housing side walls, downwardly convergent front and rear walls, and a hopper top wall secured between said second named side walls and to said rear wall, the front edge of said hopper top wall being spaced rearwardly from the front upper edge of said hopper front wall to provide a filling opening, a pair of pivot pins carried by the lower end of said hopper rockably and removably engaging in said tray slots, means carried by said front wall regulating the delivery of feed to said tray, and flexible means limiting the rocking of said hopper, said hopper being movable upwardly and forwardly to dispose said pins on the upper edge of said tray and to dispose said filling opening in uncovered position forwardly of said housing top wall.

References Cited in the file of this patent

UNITED STATES PATENTS

| | | |
|---|---|---|
| 1,895,435 | Ahrens | Jan. 31, 1933 |
| 2,168,745 | Ringer | Aug. 8, 1939 |
| 2,277,420 | Stanfield | Mar. 24, 1942 |
| 2,500,243 | Dixon | Mar. 14, 1950 |
| 2,643,637 | Lewis | June 30, 1953 |
| 2,673,551 | McAnly | Mar. 30, 1954 |
| 2,682,255 | Kleeman | June 29, 1954 |
| 2,707,454 | Wilkinson | May 3, 1955 |

FOREIGN PATENTS

| | | |
|---|---|---|
| 538,040 | Germany | Nov. 9, 1931 |